United States Patent [19]

Bloch

[11] 4,166,762
[45] Sep. 4, 1979

[54] CONTROL APPARATUS WITH FREQUENCY-DEPENDENT CONTROL ELEMENTS AND APPLICATION OF THE CONTROL APPARATUS TO REGULATING THE STEAM PRESSURE OF BOILING WATER REACTORS

[75] Inventor: Heinz Bloch, Nussbaumen, Switzerland

[73] Assignee: BBC Brown Boveri & Company Limited, Baden, Switzerland

[21] Appl. No.: 911,055

[22] Filed: May 30, 1978

Related U.S. Application Data

[62] Division of Ser. No. 661,999, Feb. 27, 1976, abandoned.

[30] Foreign Application Priority Data

Apr. 16, 1975 [CH] Switzerland ............... 4817/75

[51] Int. Cl.² ............................................. G21C 7/00
[52] U.S. Cl. ............................. 176/20 R; 176/24; 60/644; 60/646; 60/657
[58] Field of Search ............... 60/644, 646, 657; 138/31; 137/85; 333/76; 318/615–618; 165/135; 176/20, 22, 24, 19 R, 65

[56] References Cited

U.S. PATENT DOCUMENTS

| 1,194,188 | 8/1916 | Keiser | 138/31 |
|---|---|---|---|
| 2,884,955 | 5/1959 | Yost | 138/31 |
| 3,051,883 | 8/1962 | Smith | 318/611 |
| 3,080,309 | 3/1963 | Samuel | 176/24 |
| 3,184,662 | 5/1965 | Wallace | 318/618 |
| 3,332,849 | 7/1967 | Kagi | 176/20 |
| 3,351,826 | 10/1967 | Quarnstrom | 318/611 |
| 3,555,291 | 1/1971 | Dewey | 333/76 |
| 3,579,154 | 5/1971 | Deen | 333/76 |
| 3,625,815 | 12/1971 | Fishman | 176/24 |
| 3,660,744 | 5/1972 | Plummer | 318/616 |

FOREIGN PATENT DOCUMENTS 1206726 9/1970 United Kingdom ............ 318/615

OTHER PUBLICATIONS

Servomechanism Analysis, McGraw Hill, N.Y. (May 25, 1953), Thaler et al., pp. 92, 158–168.

Primary Examiner—Samuel W. Engle
Assistant Examiner—S. A. Cangialosi
Attorney, Agent, or Firm—Werner W. Kleeman

[57] ABSTRACT

A control loop for regulating the magnitude of a variable quantity of an apparatus to a reference value, for example the steam pressure in the output line from a boiling water reactor, wherein the instantaneous magnitude of the steam pressure is compared with a reference value and the difference therebetween is used to regulate a valve in the steam line in such manner as to eliminate the difference. The control loop also includes one resonance filter for the regulating medium whose resonant frequency coincides with the frequency at which the control loop, in the absence of such a filter, would become unstable.

7 Claims, 5 Drawing Figures

CONTROL APPARATUS WITH FREQUENCY-DEPENDENT CONTROL ELEMENTS AND APPLICATION OF THE CONTROL APPARATUS TO REGULATING THE STEAM PRESSURE OF BOILING WATER REACTORS

CROSS-REFERENCE TO RELATED CASE

This Application is a Divisional Application of my copending, commonly assigned U.S. application Ser. No. 661,999, filed Feb. 27, 1976, now abandoned and entitled "Control Apparatus With Frequency-Dependent Elements And Application Of The Control Apparatus To Regulating The Steam Pressure Of Boiling Water Reactors".

BACKGROUND OF THE INVENTION

The present invention relates to a new improved construction of control apparatus having frequency-dependent control elements, and furthermore, pertains to application of the control apparatus to regulating the steam pressure of boiling water reactors.

Control loops in which importance is laid on a particularly fast response require a high gain (cf. W. Oppelt: Kleines Handbuch technischer Regelvorgänge, 2nd revised and enlarged edition, Weinheim 1956, p. 355 et seq.) In such control loops this can very easily give rise to unstable conditions. In order to prevent unstable control conditions of this nature, either the gain can be reduced (although this in turn leads to longer control times), or the control loop can include additional elements which have a low gain in the range of frequencies within which the control system is unstable.

Thus, in the above-mentioned book by W. Oppelt (p. 382 et seq.), for example, a control element is described which, in order to prevent unstable regulation, exhibits a gain which decreases linearly with increasing frequency.

SUMMARY OF THE INVENTION

The principal object of the present invention is to provide a control device which ensures stable control but without involving any significant increase in the correction time.

This objective is achieved in that, in order to prevent unstable control, the control loop incorporates at least one resonance filter, the resonant frequency of this filter coinciding with the frequency at which the control loop with no filter would become unstable.

In one practical application of the invention this improved control apparatus is used for regulating the steam pressure of boiling water reactors, the resonance filter being tuned to the first natural frequency of the steam piping system.

Depending on the nature of the control system, the filters can be mechanical, electrical or electronic elements in the form of a suppression filter or rejection filters, typically known as bandstop filters included within the signal path, or wave traps in shunt with the signal path.

BRIEF DESCRIPTION OF THE DRAWINGS

By way of example, the invention is explained below with reference to the accompanying drawings, in which.

DETAILED DESCRIPTION OF THE PREFERRED EMBODIMENTS

It is a feature of boiling water reactors that the reactor is connected direct to the turbine, i.e. without any intervening heat exchangers. Since such reactor plants dot not exhibit self-stabilizing characteristics, particularly exacting demands are imposed on the system for maintaining constant pressure, and hence also on the steam-pressure control system. The relatively high gain factors thus made necessary often result in stimulation of the resonant frequencies of the steam piping system between reactor and turbine. The resonant frequencies (particularly the 1st) of the steam lines, in turn, cause the control system to become unstable at these frequencies.

Figure 1:
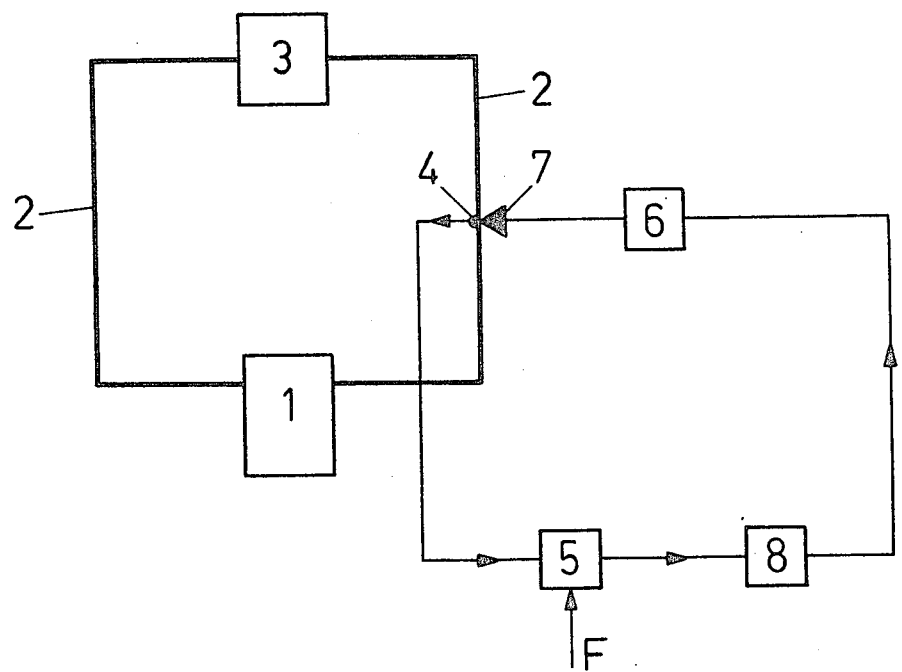
FIG. 1 schematically shows a steam-pressure regulating system for a boiling water reactor plant.

FIG. 1 shows a boiling water reactor 1 which is connected by a steam line 2 to a turbine 3. To regulate the steam pressure the latter is measured with a measuring transmitter 4. This measured value is compared in a conventional comparator element 5 with a reference input F, and the difference between measured variable and reference input, having been amplified by means of an amplifier 6, regulates a steam pressure valve 7.

To prevent pressure oscillations caused by the natural frequency of the steam line, and which can give rise to unstable control, a resonance filter 8 such as the previously mentioned suppression filter also known as bandstop filter, is located, for example, between the comparator 5 and amplifier 6.

Figure 2A:
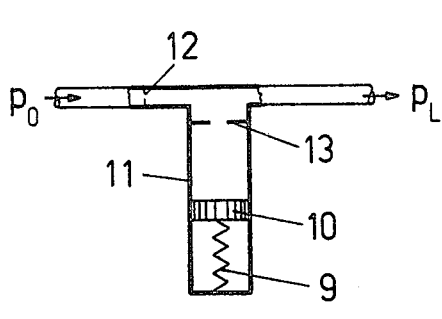
FIGS. 2a–2b and 3a–3b show two different kinds of resonance filters in the form of bandstop filters which can be used to prevent unstable control behaviour.

A mechanical bandstop filter of this kind with hydraulic components is shown in FIG. 2a. Here, reference character 9 denotes a spring and reference character 10 a piston which is joined to the spring 9 and is arranged to move in a hollow cylinder 11. To be able to influence the pressure, two orifice plates 12 and 13 are located before and in the filter, respectively.

If M is the mass of the column of liquid (oil is used as the liquid) above the piston 10 of the piston 10 itself, and the C is the constant of the spring 9, the resonant frequency $\omega_o$ of the filter is found from the equation:

$$\omega_o = (C/M)^{\frac{1}{2}}$$

Figure 2B:
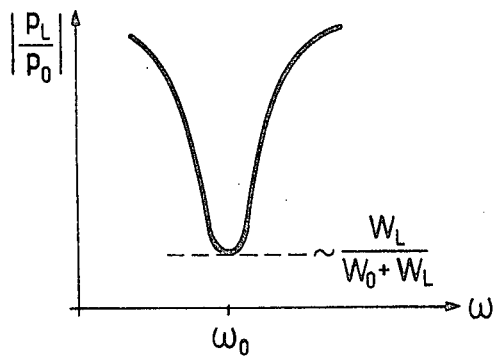

FIG. 2b shows the resonance curve of the filter of FIG. 2a. The curve represents the pressure ratio $P_L/P_o$ as a function of the oscillation frequency $\omega$. Hence, $P_o$ is the liquid pressure before the orifice 12, and $P_L$ is the liquid pressure after the filter (cf. FIG. 2a). Oil is used as the liquid.

At the resonance or resonant frequency $\omega_o$ the resonance curve attains a minimum at which $$P_L/P_o \sim W_L/(W_L + W_o)$$

where $W_L$ and $W_o$ are hydraulic resistances created by the orifice plates 12 and 13. The resistance at any given moment is obtained from the equation:

$$W = \partial \Delta p/\partial q = 2(\sqrt{\Delta p}/\eta F_B)$$

where q is the flow rate of the oil through the orifice, $F_B$ is the area of the orifice aperture, $\eta$ is the discharge coefficient and Δp is the pressure difference of the oil before and after the orifice. Accordingly, in FIG. 2a the resistance $W_o$ corresponds to orifice plate 12 of cross-section area $F_{Bo}$, and resistance $W_L$ to orifice plate 13 of cross-section area $F_{BL}$.

The general procedure is that the natural frequency $\omega_o$ of the steam piping system is first measured without any resonance filter; i.e. in the open state of the control loop. The filter is then tuned on a test bed to the desired frequency $\omega_o$, for example by varying the constant C of spring 9, and the desired slope of the resonance curve is adjusted by altering the throttle resistances $W_o$ and $W_L$. The filter is then fitted in the control loop.

In a practical example the natural frequency of the steam line was 1.5 Hz. After fitting a filter of the kind shown in FIG. 2a it was possible to increase the gain above the desired value (which guarantees sufficiently fast regulation) without distrubing pressure oscillations occurring in the control loop.

Figure 3A:
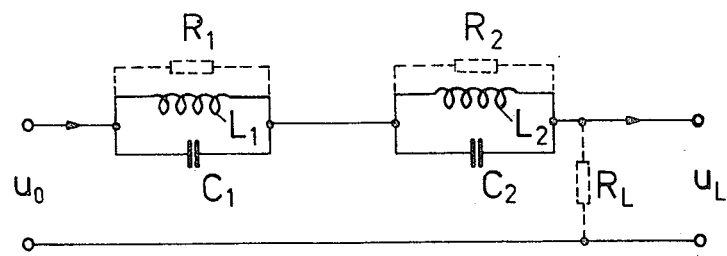

FIG. 3a shows an example of a two-wave filter for an electrical or electronic control loop. With a bandstop filter of this kind it is possible to filter out two frequencies $\omega_{o1}$ and $\omega_{o2}$ (or the whole band of frequencies between them if the two frequencies are sufficiently close to each other). If $L_1$ is the inductance of a first oscillating circuit, $C_1$ the capacitance of this oscillating circuit and $L_2$ the inductance of a second oscillating circuit with $C_2$ its capacitance, then:

$$\omega_{o1}=(L_1C_1)^{-\frac{1}{2}} \text{ and } \omega_{o2}=(L_2C_2)^{-\frac{1}{2}}$$

Figure 3B:
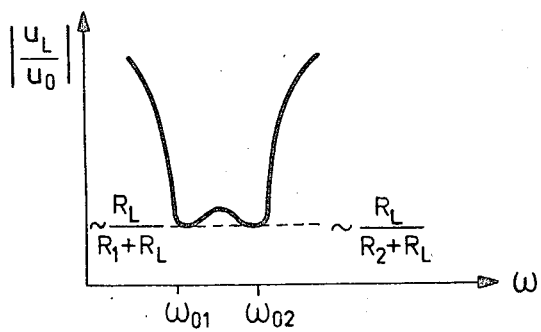

The resonance curve of such a full-wave filter is illustrated in FIG. 3b. Here, the voltage ratio $U_L/U_o$ ($U_o$=voltage at filter input, $U_L$=voltage after the filter) is plotted as a fuction of the oscillation frequency $\omega$.

At the two frequencies $\omega_{o1}$ and $\omega_{o2}$ the resulting resonance curve has two well-defined minima at which $$U_L/U_o \sim R_L/(R_1+R_L) \text{ and } \sim R_L/(R_2+R_L),$$

where
- $R_1$ = the equivalent ohmic parallel resistance of the resonant circuit $L_1$, $C_l$
- $R_2$ + the equivalent ohmic parallel resistance of the resonant circuit $L_2$, $C_2$
- $R_L$ = the ohmic input impedance of the control element at the output of the filter While there are shown and described present preferred embodiments of the invention, it is to be distinctly understood that the invention is not limited thereto, but may be otherwise variously embodied and practiced within the scope of the following claims. Accordingly,

What I claim is:

1. The combination with an apparatus containing a boiling water reactor providing steam to an output line of a steam piping system operatively connected with a turbine, of a control loop for regulating the magnitude of a variable quantity defined by the steam pressure prevailing in the steam piping system to a reference value, the control loop including means for measuring the instantaneous magnitude of the variable which is compared with a reference magnitude and the difference therebetween then used to activate control means in the apparatus to eliminate the difference, said control loop possessing a resonant frequency rendering such control loop unstable, said control loop including at least one bandstop filter means having a resonant frequency which at least approximately coincides with said resonant frequency at which the control loop is unstable for suppressing such resonant frequency to thereby stabilize the control loop.

2. The combination as defined in claim 1, wherein said bandstop filter means is tuned to the natural frequency of the steam piping system.

3. The combination as defined in claim 1, wherein said bandstop filter means constitutes the sole means for suppressing the resonant frequency of the control loop.

4. The combination as defined in claim 1, wherein said control loop regulates the steam pressure in the output line of the steam piping system.

5. The combination as defined in claim 1, wherein the control loop utilizes a fluid as a regulating medium and said bandstop filter means is of the hydraulic type.

6. The combination as defined in claim 5, wherein said hydraulic bandstop filter comprises a hollow cylinder and a spring loaded piston located therein, said loading spring exerting its pressure against one side of said piston and the other side of said piston being subjected to the pressure of the fluid flowing in said control loop.

7. The combination as defined in claim 1, wherein the control loop is of the electrical type and said bandstop filter is a passive or active electrical or electronic filter.

* * * * *